United States Patent

Antony et al.

Patent Number: 5,433,298
Date of Patent: Jul. 18, 1995

[54] ACTUATING MECHANISM FOR A SLIDING-CALIPER DISC BRAKE

[75] Inventors: Paul Antony, Worms; Hellmut Jager, Edingen-Neckarhausen, both of Germany; Wlodzimierz Macke, Viernheim, Poland; Bernd Rupprecht, Edingen-Neckarhausen, Germany

[73] Assignee: Deutsche Perrot-Bremse GmbH, Mannheim, Germany

[21] Appl. No.: 123,974

[22] Filed: Sep. 21, 1993

[30] Foreign Application Priority Data

Sep. 21, 1992 [DE] Germany .................. 42 31 560.3

[51] Int. Cl.⁶ .............................................. F16D 65/16
[52] U.S. Cl. ...................................... 188/72.7; 74/107; 188/72.9
[58] Field of Search ................ 188/72.7, 72.9, 72.8, 188/106 F, 72.1, 71.8, 71.9, 72.6, 343; 74/107; 192/93 R

[56] References Cited

U.S. PATENT DOCUMENTS

| | | | |
|---|---|---|---|
| 3,830,343 | 8/1974 | Gardner | 188/71.8 |
| 4,036,329 | 7/1977 | Anderson | 188/72.7 |
| 4,109,765 | 8/1978 | Johannesen | 188/72.7 |
| 4,522,286 | 6/1985 | Villata et al. | 74/107 X |
| 4,544,045 | 10/1985 | Runkle | 188/72.9 X |
| 4,549,442 | 10/1985 | Hans et al. | 188/343 X |
| 4,635,761 | 1/1987 | Smith et al. | 188/72.6 |
| 4,966,256 | 10/1990 | Hunt | 188/72.7 |
| 5,064,034 | 11/1991 | Rupprecht et al. | 188/343 |

FOREIGN PATENT DOCUMENTS

| | | |
|---|---|---|
| 0291071 | 11/1988 | European Pat. Off. |
| 3213356 | 11/1982 | Germany . |
| 3423875 | 1/1985 | Germany . |
| 3411745 | 10/1985 | Germany . |
| 2614321 | 1/1987 | Germany . |
| 2649666 | 4/1988 | Germany . |
| 4032885 | 4/1992 | Germany . |

*Primary Examiner*—Douglas C. Butler
*Attorney, Agent, or Firm*—Jacobson, Price, Holman & Stern

[57] ABSTRACT

An actuating mechanism for a sliding caliper disc brake has an actuator shaft with a projection in the form of an involute with an increasing radius. The involute is linked to an arcuate shaped rolling element through a pin fitting in recesses in the respective parts. The rolling element applies pressure to a thrust piece for actuating the brake when the actuator shaft is rotated by a brake lever. The axis of the actuator shaft is displaced from the center plane of the thrust piece so that the line of contact of the projection and the rolling element is constantly on the center plane.

10 Claims, 5 Drawing Sheets

ACTUATING MECHANISM FOR A SLIDING-CALIPER DISC BRAKE

BACKGROUND OF THE INVENTION

This invention relates to an actuating mechanism for a sliding-caliper disc brake having a caliper and an actuator shaft connected to a brake lever which is disposed between one side of the brake disc and the caliper (or an element rigidly connected to the caliper), wherein the axis of the said shaft extends transversely to the axis of the brake disc, wherein an approximately semicylindrical first region of said shaft is supported against the caliper by means of a first partial roller bearing and is thereby rotatable with respect to the caliper by swinging the brake lever, further wherein said shaft carries a projection on its side directed toward the brake disc and away from the first semicylindrical region of the shaft, which projection cooperates, via a rolling element and a second partial roller bearing with a thrust piece which applies force to the brake disc.

In a known mechanism of this type (Eur. Pat. 0,291,071 B1), the projection comprises an eccentric on the actuator shaft which abuts against a rolling element in the form of a rolling plate which is disposed parallel to the plane of the brake disc and which serves to avoid jamming and to reduce sliding friction. The rolling element is supported against the thrust piece via roller bearings. When the brake is actuated, the eccentric carries along the rolling plate against the restoring force of a return spring. If the spring fails, the rolling plate no longer performs its desired function, and upon release of the brake the rolling plate may not be returned to its starting position. Rather, the rolling plate may remain in a radially inner position, and a subsequent actuation of the brake will lead to high sliding friction between the eccentric and the stationary rolling plate. When the brake is actuated, moreover, the position of the contact line of the eccentric changes continuously with respect to the central axis of the thrust piece. This leads to high frictional stresses in the region of the guide means of the thrust piece in the caliper. A further disadvantage from the structural standpoint is the relatively large radial extent of the rolling plate, if it is to withstand high loads, because the extent of the rolling plate depends on the number of rolling elements in the roller bearing.

In order to obviate the above-described unfavorable friction conditions, it is known (Ger. OS 40 32 885) to couple the thrust piece and the actuator shaft via an eccentric antifriction bearing mechanism in the form of a rotational bearing parallel to the axis of rotation of the actuator shaft. While this does improve the friction conditions, the space requirement is substantial, and moreover there is the disadvantage that when the brake lever is actuated the antifriction bearing mechanism undergoes a circular excursion, such that the effects of the forces which develop include undesirable tilting movements of the thrust piece, which movements are difficult to estimate. This leads to nonuniform stressing of the brake linings and hence radial wear, and eventually at maximum braking force the surface stresses are excessive. By mounting the thrust piece to be rotatable in the caliper, using a tubular projection with radial play, during braking the thrust piece can be readily rotatable around the brake axis in response to the circumferential forces, as a result of which disadvantageous bearing stresses occur on the bearing configuration of the eccentric bearings.

A further mechanism as disclosed in German OS 34 11 745 A1 employs an eccentric configuration with the use of a thrust rod; however this arrangement is suitable only for parking brakes. German Pat. No. 2,614,321 C2 discloses the use of a friction-reducing sphere, which results in a mechanism which is unstable and is beset by high sliding friction; and German OSs 31 13 356 A1 and 34 23 875 A1 disclose brake application mechanisms having sliding bearings and comprising thrust pieces which are swingably mounted in the caliper. The swinging movements of the thrust pieces result in disadvantageous radially nonuniform application of the brake lining an undesirable radial wear on the brake lining on the side of the brake disc on which the actuating mechanism is disposed. Further, U.S. Pat. No. 3,830,343 discloses an application mechanism wherein a rotatably mounted cam, which can be acted on by a piston and cylinder unit and which has an involute-shaped contour, acts on a rolling plate which is springably mounted on the lining support. In the event of a failure in the mounting of said plate, the end result can be the same as discussed above in connection with Eur. Pat. 0,291,971 B1. Further, as the brake lining undergoes progressive wear the involute-shaped cam is swung outwardly by means of a one-way coupling, thereby necessitating a large radial installation space. This disadvantage is also seen in the case of the disc brake according to Ger. Pat. No. 2,649,666 C2.

SUMMARY OF THE INVENTION

It is an object of the invention to improve the application mechanism of the type described to provide a structurally simple, space saving configuration wherein the application of force is constantly linear and passes through the center plane of the brake to the brake lining, from the initiation to the termination of force application, and wherein frictional losses are substantially reduced.

The invention is characterized essentially in that the projection on the actuator shaft on the side of the shaft directed toward the brake disc has a profile in the form of an involute, wherein the swinging radius of the involute increases such that the path length of the force flux increases in the same way during each braking action i.e. in the same kinematic relation regardless of the wear status of the brake lining; in that the axis of the actuator shaft is spaced with respect to the center plane of the thrust piece such that the line of contact of the involute-shaped projection on the shaft with the rolling elements lies constantly in the center plane as the shaft is rotated to apply and release the brake; further in that the radius of the rolling element is greater than the largest effective radius of the involute-shaped profile of said projection; and in that an interlocking linkage is provided between the cylindrical-segment-shaped rolling element and the shaft projection.

The mechanism ensures a low-friction thrust contact, not only on the side of the actuator shaft directed toward the caliper but also on the side directed toward the brake disc. The linage between the rolling element and the shaft projection enables secure, low-friction operation despite a rolling element which is optimally short in length. The shape of the rolling element, in the form of a cylindrical segment, itself contributes to the compactness of the structure. Because the application of stress to the thrust piece from the actuator shaft via the rolling element is exclusively in the center plane of the thrust piece, which plane extends in the plane of the brake axis and symmetrically with regard to the lateral thrust piece guide surfaces on the caliper, only minimal friction losses occur in the region of the guide surfaces. The disadvantages present with known mechanism where the direction of force application changes as a result of tilting and rotational movements of the thrust piece are thus substantially eliminated.

It has been found particularly advantageous, in a further refinement of the application mechanism, if the linkage between the rolling element and the involute-shaped shaft projection, is provided by a pin which is attached to one of the parts and projects from it, engaging, with play, in a recess provided in the other part.

Alternative or additionally it is possible for the linkage to be in the form of a linking projection on the actuator shaft which occludes one end face of the rolling element, and a recess in the other end face of the rolling element, which recess is engaged by the brake lever extending from the actuator shaft.

Additional details, advantages, and features of the invention will be apparent from the following description with reference to the accompanying drawings, all essential significant details of which not otherwise specifically discussed are incorporated herein by reference.

DESCRIPTION OF PREFERRED EMBODIMENTS

Structure

Figure 1:
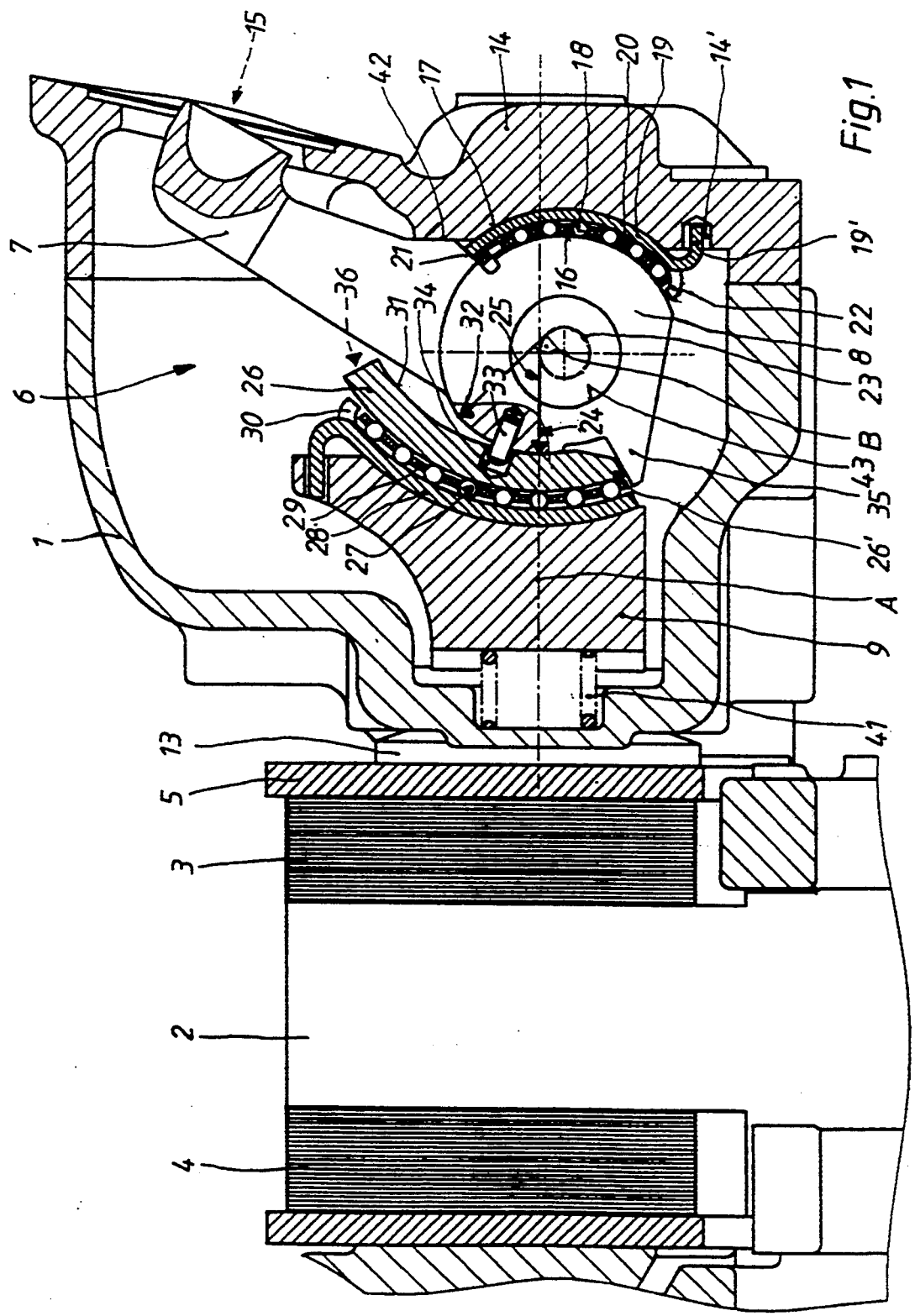
FIG. 1 is a cross sectional view of a disc brake actuator mechanism according to the invention transverse to the plane of the brake disc.
Figure 2:
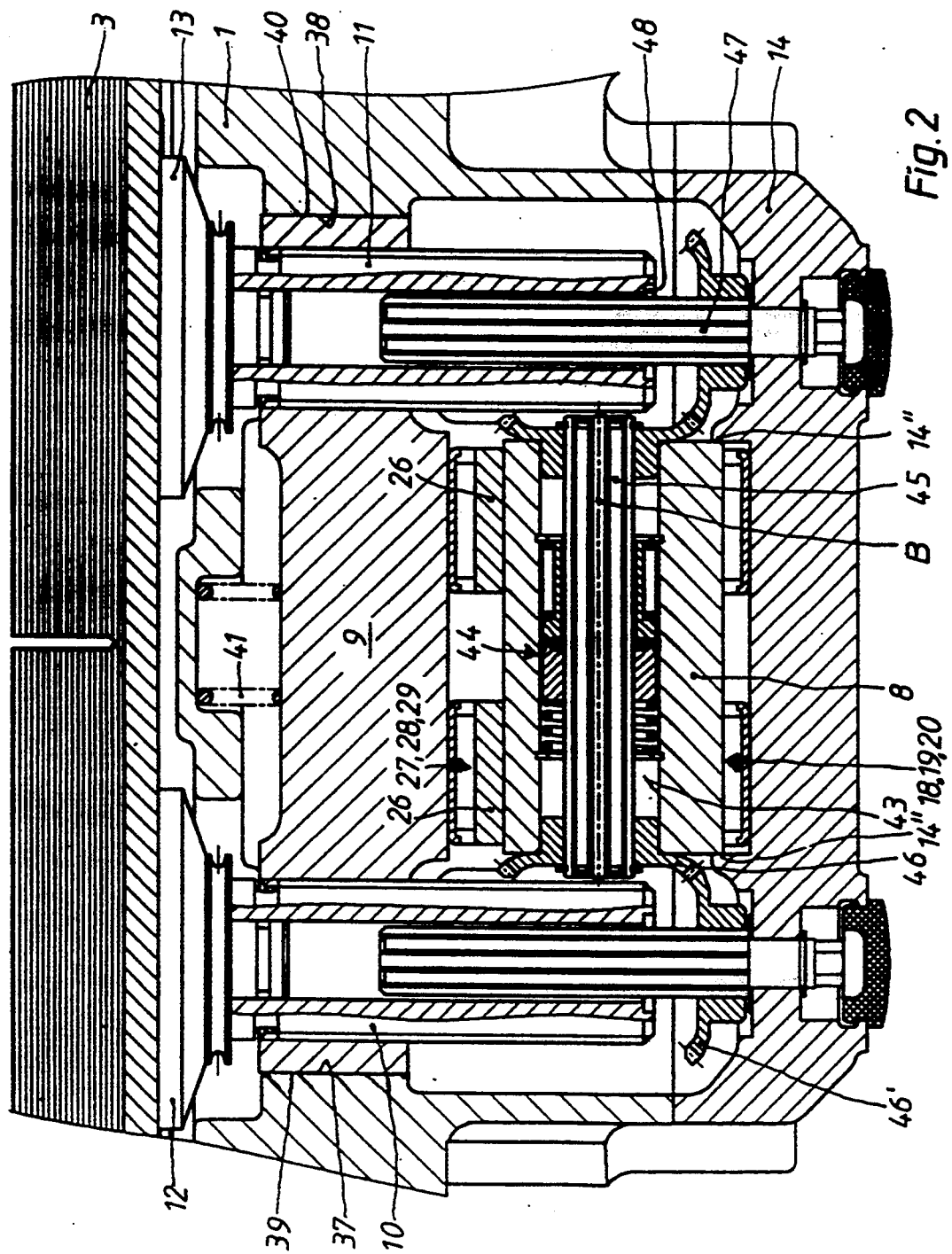
FIG. 2 is a cross sectional view in the plane of axis A shown in FIG. 1.

Referring to FIGS. 1 and 2, a disc brake has a caliper 1 with two arms which extend over a brake disc 2 in known manner. On both sides of the brake disc, brake linings 3, 4 disposed on lining supports 5 are guided in a brake support (not shown) or in the caliper 1. In a manner not illustrated, the caliper 1 is mounted so as to be slidable transversely to the brake disc with the aid of guide elements. On one side the caliper 1 has an application mechanism 6 according to the invention for actuating the brake.

The application mechanism 6 is essentially comprised of a brake lever 7 which is connected to a brake actuator shaft 8 disposed parallel to the plane of the brake disc, and a thrust piece 9 which is guided and supported in the caliper 1, wherein respective thrust spindles 10, 11 (FIG. 2) are screwed into said thrust piece 9 at locations laterally displaced on opposite sides of the plane of the brake axis A. Respective thrust heads 12, 13 directed toward the brake disc 2 are inserted in the thrust spindles.

A cover 14 is affixed to the caliper 1, and a brake cylinder 15 is affixed to the cover. The Drake lever 7 provides connection between the brake cylinder 15 having a brake plunger, (not shown) and the brake actuator shaft 8. The shaft 8 has a specially configured outer contour around its neutral rotation axis B. Shaft 8 has an approximately semicylindrical shaft region 16 disposed around the axis B parallel to the cover 14 connected to the brake caliper 1, which region 16 engages a coaxially disposed approximately cylindrical inner surface 17 of the cover 14, via a first partial roller bearing 18 with bearing shells 19. Each bearing shell 19 is held in place on the cover 14 by a bent end member 19' which engages the interior of a bore 14'. The bearing cage 20 is positioned against a projecting detent 21 on the actuator shaft 8 and a detent 22 on the bearing shell 19. Additional or alternative means for holding the bearings may also be used.

The actuator shaft 8 is provided with a projection 24 on the side facing toward the brake disc 2, which projection has a profile in the form of an involute of varying radius generated by an unwinding from an imaginary circle 23. The diameter of the circle 23 around the neutral rotation axis B is chosen such that the tangent 25 to the circle is in the plane of the brake axis A. Thus, with rotation of the actuator shaft 8 there is a constant linear locus of contact, in plane A, at the increasing radius of the involute transmitted to an opposing piece 26 in the form of a rolling element.

The rolling element 26 has a general configuration of a cylindrical segment, and rests against the involute-shaped projection 24 in the plane of the brake axis A on a locus which is linear, and on the other side rests against the thrust piece 9 via a coaxial partial roller bearing 27.

Figure 5:
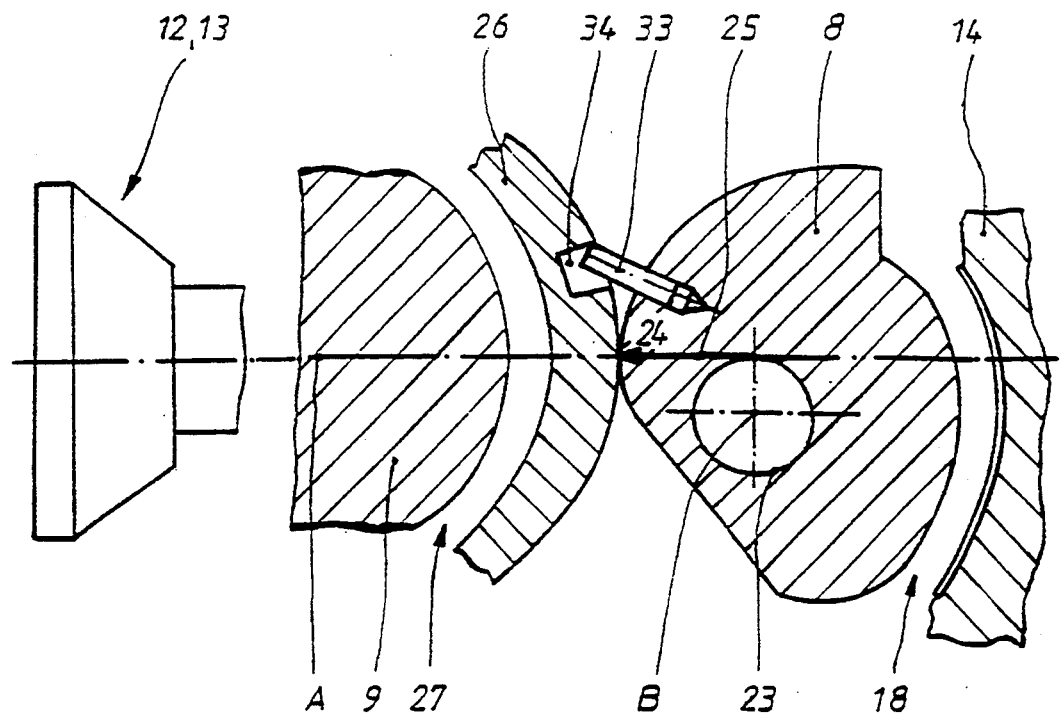
FIGS. 5, 5a, 6 and 6a are enlarged schematic cross sectional views transverse to the plane of the brake disc, illustrating functional positions when different rolling elements are actuated.
Figure 5A:
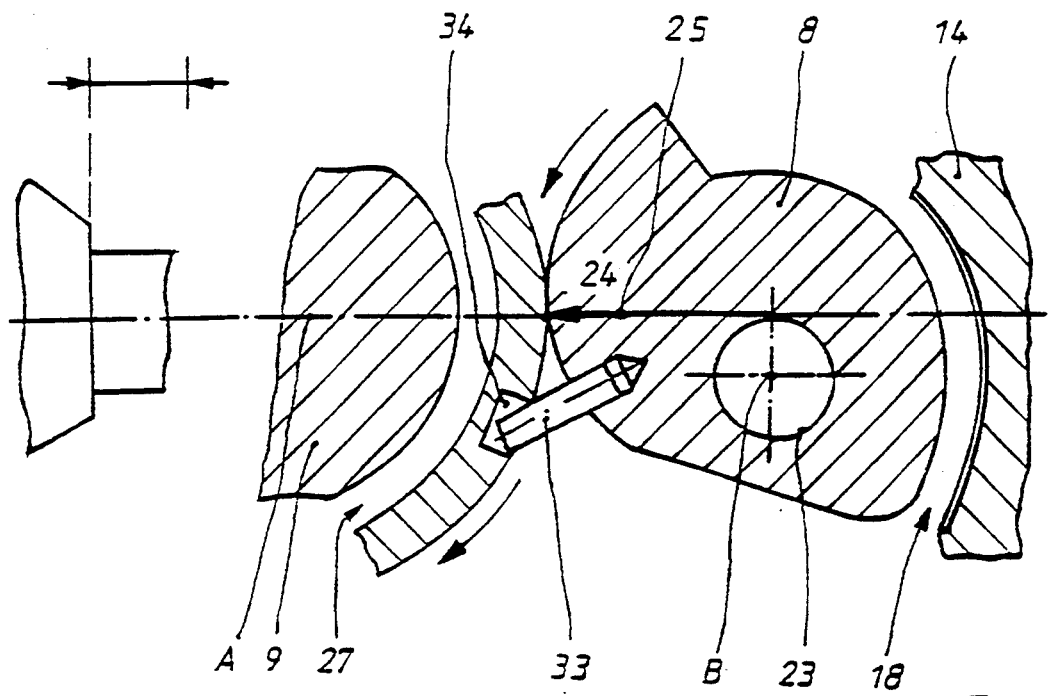

According to the embodiment shown in FIGS. 5 and 5a, the curvature of the rolling element 26 can be in the opposite direction from that of the involute-shaped projection 24. Accordingly, in this embodiment the bearing shell 28 (not illustrated in FIGS. 5 and 5a) is affixed to the thrust piece 9 via a bend, and the roller bearing cage 29 is held between the rolling element 26 and the bearing shell 28 by means of detents in a manner essentially corresponding to that shown in FIG. 1.

Figure 6:
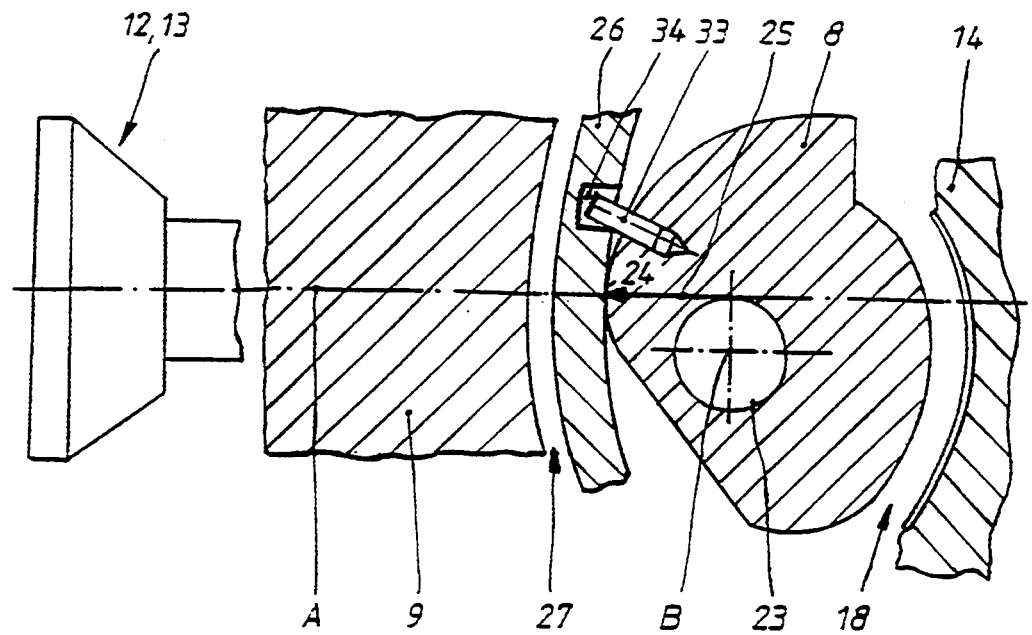
Figure 6A:
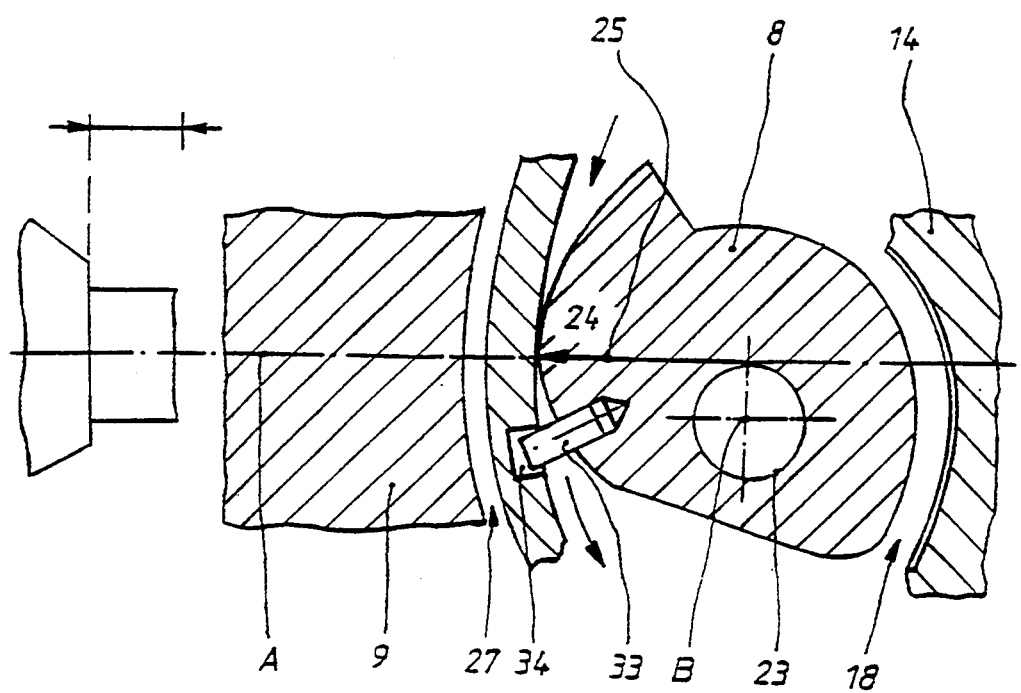

According to a second embodiment corresponding to FIGS. 1, 6 and 6a, which embodiment is more advantageous, the curvature of the rolling element 26 may be in the same direction as that of the involute-shaped projection 24. In this embodiment the radius of curvature 31 of the rolling element 26 is longer than the largest radius 32 of the involute-shaped projection 24, so as to provide more compliance and thereby avoid possible jamming. The bearing cage 29 is attached to the rolling element 26 via a detent 26' and to the bearing shell 28 via a detent 30. Additional or alternative means of holding the bearings may be provided.

In both the embodiment according to FIGS. 5 and 5a, and the embodiment according to FIGS. 1, 6 and 6a, the rolling element 26 is interlockingly engaged with the involute-shaped projection 24 by means of a pin 33. The pin 33 is disposed without play in a recess in one of the two parts, and with radial play in another recess in the other of the two parts, with the magnitude of the play being such that the projection 24 may undergo an angular shift with respect to the rolling element 26. The inventive positioning of the pin 33 with respect to the plane of the brake axis A is referred to in the description of the function of the device presented hereinbelow.

Figure 4:
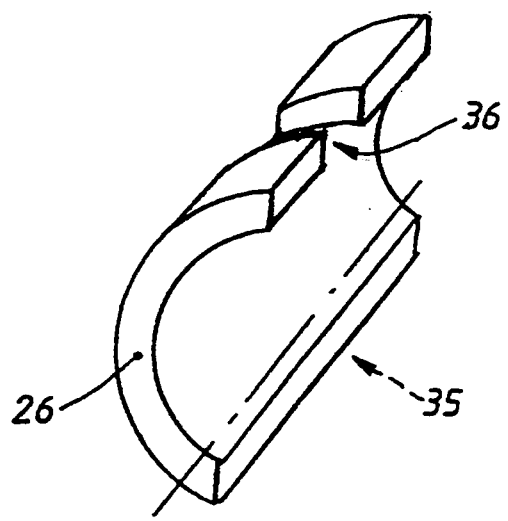
FIG. 4 is a perspective view of a curved rolling element.

As a further advantage, the rolling element 26 according to FIG. 4, having the general shape of a cylindrical segment, may be positioned with respect to the involute-shaped projection 24 by the following means: the lower region of the application shaft 8 bears a projection 35 (FIG. 1) against which the cylindrical-segment-shaped rolling element 26 abuts on one side. On the other side of said rolling element is a recess 36 which is engaged by the brake lever 7. In this way, the rolling element 26 is also secured against axial displacement. With this arrangement, the bearing cage 29 can also abut the projection 35.

Additional and alternative interlocking means of interconnection may be provided.

The bearings 18, 27 and the cylindrical-segment-shaped elements 26 can extend over the entire axial extent of the actuator shaft; or, alternatively, as illustrated for example in FIG. 2, the elements 26 may have a plurality of axial segments. The configurations of their holding elements will be adjusted accordingly.

Figure 3:
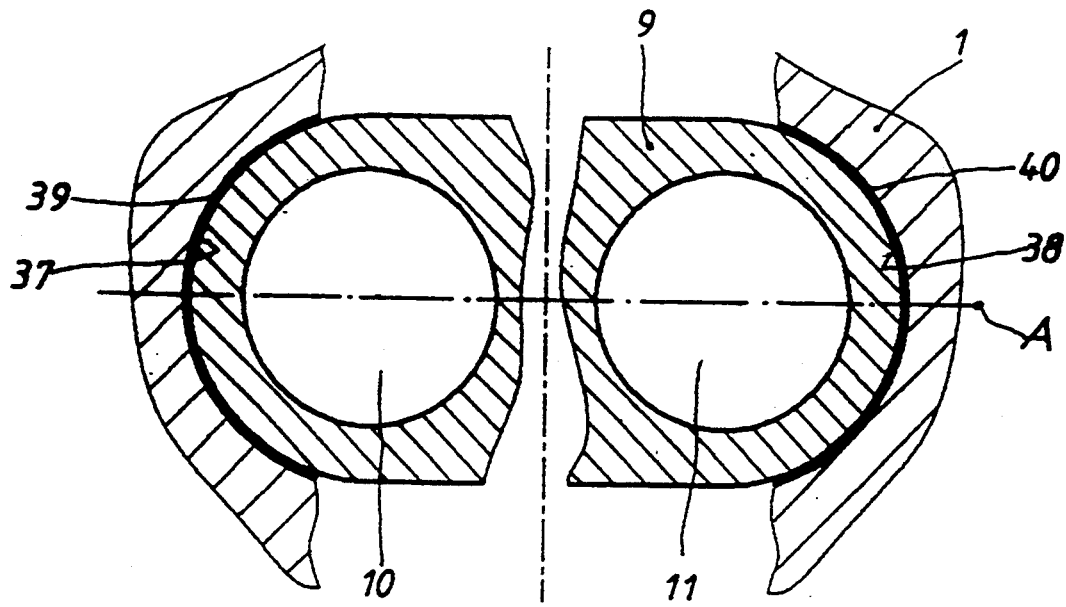
FIG. 3 is a cross sectional view of part of the mechanism parallel to the plane of the brake disc.

In the general manner shown in FIG. 3, the thrust piece 9 has semicylindrical projections 37 laterally of the respective thrust spindle bearings 10, 11 and disposed symmetrically with respect to the plane of the brake axis A; these projections engage the approximately cylindrical interior guideways 39 in the caliper 1. In this way the thrust piece 9 is guided and supported in caliper 1 in the radial and lateral directions. A prestressed compression spring 41 (FIG. 1) disposed between the caliper 1 and the thrust member 9 serves a mutual holding function with regard to the brake parts. In this connection, the brake lever 7 according to FIG. 1 abuts a detent 42 on the caliper 1 or cover 14. As seen in FIG. 2, the profiled shaft 8 is positioned in its axial direction between lateral detents 14" on the cover 14.

According to FIG. 2, the profiled shaft 8 is provided with a through-bore along the neutral rotation axis B which is suitable for accommodating, in a space-saving manner, a force-dependent adjustment mechanism 44 to control uniform application of the thrust heads 12, 13. The adjustment mechanism 44 is coupled directly to the application shaft 8. An adjusting shaft 45 which extends through essentially the entire extent of the through-bore 43 is connected to the adjustment mechanism 44 as well. Respective parts 46 of an angle drive are mounted on each of the two ends of the adjusting shaft 45. The corresponding parts 46' are mounted on respective splined shafts 47 which extend in associated thrust spindles 10, 11; said shafts 47 are operatively connected to said spindles 10, 11 via respective profiled flanges 48 which provide a rotational linkage combined with axial slidability.

Operation

FIGS. 1, 2, 5 and 6 show the disc brake in the disengaged state, wherein the brake lever 7 rests against the detent 42, and the partial roller bearings 18, 27 and their cages 20, 29 are secured against sliding by means of their associated detents and projections. The rolling element 26 is also held with respect to the involute-shaped projection 24 by means of engaging pieces in the form of the pin 33 and the recess 34, and the projection 35 and the recess 36. The locus of the projection 24 in the plane of the brake axis A is linear, and projection 24 rests against the curbed rolling element 26 at approximately the smallest radius of projection 24.

The two thrust spindles 10, 11 with the thrust heads 12, 13 are screwed into the thrust piece 9 to an extent such that the required air gap is present between the brake linings 3, 4 and the brake disc 2. The interior parts are mutually stressed by means of the compression spring 41.

If the brake lever 7 is actuated so as to force it in the direction toward the brake disc, i.e. counterclockwise in FIG. 1, it is moved free of the detent 42. The lever rotates the involute-shaped projection 24 from the rest position, and the detent 21 for the bearing cage 20 is moved away from the cage. In the process, the cage 20 also moves away from the detent 22. As a result of an increase in the radius of involute 24, whereby displacement toward the brake disc is increasingly produced, the cylindrical-segment-shaped rolling element 26 is carried along in the counterclockwise direction and radially outwardly, which the locus of contact in the plane of the brake axis A remains a constant straight line, and thus the thrust piece 9 is displaced axially towards the brake disc 2.

In the process, the osculation disparity (difference between the radii 31 and 32) in the upper involute region decreases continuously, and the rolling element 26 moves downward on the partial roller bearing 27. The position of the rolling element 26 with respect to the involute-shaped projection 24 is constrained by the above-described interlocking engaging pieces 33, 34, 35, the recess 34 of the pin 33 being large enough so that jamming cannot occur while rolling under compression. By appropriate choice of the position of the pin 33 with respect to the plane of the brake axis A, actuation of the brake causes the pin 33 to be carried approximately symmetrically around axis A.

As seen in FIG. 6, in the disengaged position of the brake, the pin 33 abuts the radially upper surface of the recess 34, at a slight angular attitude. When the brake is actuated, pin 33 moves away from said surface. Meanwhile the bearing cage 29 also moves away from the detent 30. When the brake is released, the pin 33 again engages the rolling piece 26 at approximately the radially upper surface of the recess 34, and in the disengaged position of the brake, the pin detains the cylindrical-segment-shaped rolling element 26.

FIGS. 5 and 5a and 6 and 6a show that the angular attitude of the pin 33 with respect to the recess 34 is reversed in the disengaged position of the brake and in the actuating position.

When the brake is actuated, the thrust piece 9 slides against the prestressing force of the compression spring 41 and is displaced axially toward the brake disc 2, whereby the approximately semicylindrical projections 37, 38 slide in the approximately semicylindrical inner guides 39, 40 of the brake caliper 1. The thrust spindles 10, 11 screwed into the thrust piece 9 are carried along, along with the thrust heads 12, 13, whereby eventually the brake lining 3 is pressed against the brake disc 2. In known manner the opposing brake lining 4 is pressed by the caliper 1 against the brake disc 2.

By means of the inventive support of the thrust piece 9 in all directions, transverse forces from the thrust heads 12, 13 which result during braking from the circumferential force and are manifested in a tilting, are absorbed by the brake caliper 1 and are not transmitted to the bearings of the application mechanism.

Because the braking force is exerted over a linear abutting-locus by means of an involute-shaped projection 24, the resulting direction of force during rotation stays constantly in the plane of the brake axis A, so that the brake lining 3 on the actuating side of the brake disc 2 is pressed uniformly against the brake disc 2 via the thrust heads 12, 13 which are also disposed in said plane.

In this way, the disadvantage described above, namely swinging eccentric actuating configurations wherein the force does not stay constantly in the plane of the brake axis are substantially obviated Rotational movement of the application shaft 8 is converted, via the adjustment mechanism 44 coupled to shaft 8, the adjusting shaft 45, and the angle drives 46, 46' disposed on the two sides to rotational movement of the splined shafts 47. The latter are in turn integrated into the thrust spindles 10, 11 and are rotationally coupled to said spindles 10, 11 in the unscrewing direction, to adjust for wear of the brake lining.

When the brake is released, all of the parts return to their starting positions. The adjustment mechanism is un-coupled during this release movement, by means of a one-way coupling.

We claim:

1. An actuating mechanism for a sliding-caliper disc brake having a brake disc, a caliper, an application shaft connected to a brake lever, said shaft being disposed between one side of the brake disc and a part of the caliper, said application shaft having an axis extending transversely to a rotation axis of the brake disc, wherein an approximately semicylindrical first region of said application shaft is supported against said part of the caliper by a first partial rolling bearing for rotation with respect to said part of the caliper produced by swinging the brake lever, further wherein said application shaft has a projection directed toward the brake disc substantially opposite said first semicylindrical region which projection cooperates, through a rolling element and a second partial rolling bearing, with a thrust piece for applying force to the brake disc, said projection having a profile in the form of an involute with a varying swing radius which increases in a brake applying direction, further wherein the axis of the application shaft is displaced with respect to a center plane of the thrust piece such that a line of contact of said projection with said rolling element lies constantly in said center plane as the application shaft is rotated to engage and disengage the brake, further wherein the rolling element has a radius of curvature greater than the largest effective radius of said projection, and still further wherein an interlocking linkage is provided between said rolling element and said projection.

2. An actuating mechanism according to claim 1; wherein said interlocking linkage comprises a pin attached to one of two parts consisting of the rolling element and the projection and projects from said one part engaging, with play, a recess provided in the other of said parts.

3. An actuating mechanism according to claim 1; wherein said interlocking linkage comprises a linking projection on the application shaft, which projection occludes one end face of the rolling element, and a recess in an opposite end face of the rolling element, which recess is engaged by the brake lever.

4. An actuating mechanism according to claim 3; wherein said one end of the rolling element is a leading end thereof in the direction of brake application.

5. An actuating mechanism according to claim 1; wherein the first partial roller bearing includes a bearing shell and is held in place at one end by a detent on the application shaft and at an opposite end by a detent on the bearing shell.

6. An actuating mechanism according to claim 1; wherein the second partial roller bearing has a bearing shell and is held in place, with respect to the rolling element, at one end by means of a first detent disposed on said rolling element, and at an opposite end by means of a detent on the bearing shell.

7. An actuating mechanism according to claim 1; which includes bearing means for the thrust piece in the caliper, which bearing means are disposed symmetrically with respect to the caliper center plane.

8. An actuating mechanism according to claim 1; wherein the thrust piece is supported on all sides with respect to the caliper.

9. An actuating mechanism according to claim 8; wherein the thrust piece has semicylindrical projections supported in substantially semicylindrical guides in the caliper.

10. An actuating mechanism according to claim 1; wherein the application shaft is held in place in an axial direction between two lateral detents on parts of the caliper.

* * * * *